United States Patent
Ellmer et al.

(10) Patent No.: US 8,001,951 B2
(45) Date of Patent: Aug. 23, 2011

(54) METHOD AND DEVICE FOR CONTROLLING AN INTERNAL COMBUSTION ENGINE

(75) Inventors: Dietmar Ellmer, Regensburg (DE); Rüdiger Herweg, Esslingen (DE); Thorsten Lauer, Holzheim a. Forst (DE); Michael Mladek, Karlsruhe (DE); Mayk Stelter, Stuttgart (DE)

(73) Assignee: Continental Automotive GmbH, Hannover (DE)

( * ) Notice: Subject to any disclaimer, the term of this patent is extended or adjusted under 35 U.S.C. 154(b) by 590 days.

(21) Appl. No.: 11/659,396

(22) PCT Filed: Jul. 20, 2005

(86) PCT No.: PCT/EP2005/053497
§ 371 (c)(1),
(2), (4) Date: Nov. 10, 2008

(87) PCT Pub. No.: WO2006/015929
PCT Pub. Date: Feb. 16, 2006

(65) Prior Publication Data
US 2009/0095256 A1    Apr. 16, 2009

(30) Foreign Application Priority Data
Aug. 5, 2004   (DE) .......................... 10 2004 038 121

(51) Int. Cl.
*F02M 7/00* (2006.01)
*G06F 17/00* (2006.01)

(52) U.S. Cl. ................... 123/435; 123/568.14; 701/114; 701/115

(58) Field of Classification Search .................. 123/435, 123/676, 568.14; 73/114.16, 114.17; 701/103, 701/111, 114, 115
See application file for complete search history.

(56) References Cited

U.S. PATENT DOCUMENTS
4,624,229 A * 11/1986 Matekunas .............. 123/406.41
5,219,227 A * 6/1993 Yang et al. .................... 374/143
(Continued)

FOREIGN PATENT DOCUMENTS
DE    43 18 504 C1    10/1994
(Continued)

OTHER PUBLICATIONS
Dip.-Ing. Eckart Schloz Aus Marbach, "Untersuchungen zur homogenen Dieselverbrennung bei innerer Gemischbildung", Dissertation, Jan. 24, 2003, pp. 127-128.

*Primary Examiner* — Thomas N Moulis
(74) *Attorney, Agent, or Firm* — King & Spalding L.L.P.

(57) ABSTRACT

In order to control an internal combustion engine according to the invention, a polytropic exponent is determined in accordance with at least two measured values of the pressure in the combustion chamber of the cylinder, said measured values being detected after closing the gas discharge valve and before successively opening the gas intake valve. An exhaust gas mass which is located in the cylinder after closing the gas discharge valve and before successively opening the gas intake valve is determined according to the polytropic exponent at an estimated value of the pressure after closing the gas discharge valve and before successively opening the gas intake valve as well as at a certain temperature of the exhaust gas located in the cylinder after closing the gas discharge valve and before successively opening the gas intake valve. An actuation signal for controlling an actuating member of the internal combustion engine is generated in accordance with the determined exhaust gas mass.

20 Claims, 3 Drawing Sheets

U.S. PATENT DOCUMENTS

| | | | |
|---|---|---|---|
| 6,484,694 B2* | 11/2002 | Thomas | 123/435 |
| 6,612,294 B2* | 9/2003 | Hiraya et al. | 123/568.14 |
| 7,181,332 B1* | 2/2007 | Vick et al. | 701/103 |
| 7,454,286 B2* | 11/2008 | Sinnamon et al. | 701/110 |
| 7,685,871 B2* | 3/2010 | Sinnamon | 73/114.69 |
| 7,826,960 B2* | 11/2010 | Ellmer et al. | 701/111 |
| 2005/0039721 A1* | 2/2005 | Truscott et al. | 123/406.22 |
| 2007/0250255 A1* | 10/2007 | Matekunas et al. | 701/114 |

FOREIGN PATENT DOCUMENTS

| | | |
|---|---|---|
| DE | 199 00 738 C1 | 6/2000 |
| DE | 102 45 790 A1 | 4/2004 |
| EP | 0 399 069 A1 | 11/1990 |
| EP | 1 138 896 A2 | 10/2001 |
| EP | 1 300 588 A1 | 4/2003 |
| WO | WO 02/095191 A2 | 11/2002 |

* cited by examiner

METHOD AND DEVICE FOR CONTROLLING AN INTERNAL COMBUSTION ENGINE

CROSS REFERENCE TO RELATED APPLICATIONS

This application is the US National Stage of International Application No. PCT/EP2005/053497, filed Jul. 20, 2005 and claims the benefit thereof. The International Application claims the benefits of German application No. 10 2004 038 121.6 filed Aug. 5, 2004, both of the applications are incorporated by reference herein in their entirety.

FIELD OF INVENTION

The invention relates to a method and a device for controlling an internal combustion engine comprising at least one cylinder in which a combustion chamber is embodied, and which comprises an intake tract, which communicates with the combustion chamber of the cylinder as a function of the position of a gas intake valve, and which comprises an exhaust gas tract, which communicates with the combustion chamber of the cylinder as a function of the position of a gas discharge valve, and with a cylinder pressure sensor, which detects the pressure in the combustion chamber of the cylinder.

BACKGROUND OF THE INVENTION

Rising energy costs and the intensification of legal regulations with regard to the permissible fuel consumption or the permissible emission of noxious substances by motor vehicles in which internal combustion engines have been fitted make it necessary to take measures to reduce the fuel consumption of internal combustion engines, on the one hand, and, on the other hand, to ensure that the emission of noxious substances by the motor vehicle is kept at a low level. In this context, it has become a well known fact that internal combustion engines, in particular gasoline-operated internal combustion engines, must be operated at specific operating points with a self-igniting combustion method, which is also referred to as Homogeneous Charge Compression (HCCI) Ignition, Compressed Auto Ignition (CAI), or a space ignition method (RZV). In the case of such a self-igniting combustion method, the self-ignition and thereby the combustion curve are controlled via the reactive quantity of energy in the cylinder of the internal combustion engine. This quantity of energy is provided amongst others by a very large volume of residual gas compared with the conventionally ignited spark ignition engine operation or gasoline engine operation. Even for conventionally ignited spark ignition engines or gasoline engines it is a well known fact that the internal combustion engine must be operated at the lower and the medium partial load range with a high exhaust gas return rate in order to optimize the combustion with regard to the quality criteria referred to as the fuel consumption and the emission of noxious substances.

A method for determining a combustion chamber pressure curve in the case of an internal combustion engine is known from DE 199 007 38 C1. In this method, an estimated value of a cylinder pressure is estimated from a previous measured value of the cylinder pressure, a volume of the cylinder allocated to this and a volume of the cylinder allocated to the estimated value of the cylinder pressure and a polytropic exponent by means of the polytropic equation. The polytropic exponent is predetermined as a function of a coolant temperature.

An additional method for determining the pressure of a combustion chamber in a cylinder of an internal combustion engine is known from EP 0 399 069 A1. This involves determining a sensitivity of the cylinder pressure sensor allocated to said internal combustion engine in each working cycle of the cylinder and doing this as a function of three voltage measuring signals and a predetermined polytropic exponent.

SUMMARY OF INVENTION

The object of the invention is to create a method and a device for controlling an internal combustion engine, which ensures an accurate control of the internal combustion engine.

The invention is characterized by a method and a corresponding device for controlling an internal combustion engine comprising at least one cylinder in which a combustion chamber is embodied, and which comprises an intake tract, which communicates with the combustion chamber of the cylinder as a function of the position of a gas intake valve, and which comprises an exhaust gas tract, which communicates with the combustion chamber of the cylinder as a function of the position of a gas discharge valve, and with a cylinder pressure sensor, which detects the pressure in the combustion chamber of the cylinder. A polytropic exponent is determined as a function of at least two measured values of the pressure in the combustion chamber of the cylinder, said measured values being detected after closing the gas discharge valve and before subsequent opening of the gas intake valve. An exhaust gas mass, which is located in the cylinder after closing the gas discharge valve and before subsequent opening of the gas intake valve is determined as a function of the polytropic exponent at an estimated value of the pressure after closing the gas discharge valve and before subsequent opening of the gas intake valve as well as at a certain temperature of the exhaust gas located in the cylinder after closing the gas discharge valve and before subsequent opening of the gas intake valve. An actuation signal for controlling an actuating member of the internal combustion engine is generated as a function of the determined exhaust gas mass. In this way, it is possible to determine the exhaust gas mass in a very accurate manner. The exhaust gas mass is an important parameter for an accurate adjustment of the desired subsequent combustion of an air-to-fuel mixture in the subsequent power stroke of the cylinder.

In an advantageous manner, the estimated value of the pressure in the combustion chamber, which is used to determine the exhaust gas mass, is determined as a function of a measured value of the pressure, which is detected in a high-pressure phase and is done after closing the gas discharge valve and before subsequent opening of the gas intake valve. In this way, it is possible that the estimated value of the pressure in the combustion chamber in which the cylinder pressure sensor is arranged to measure high pressures, in most cases can be determined very accurately. To this end, the high-pressure phase in this context means the said crankshaft angle range, which is located in the combustion chamber of the cylinder around the maximum pressure after closing the gas discharge valve and before subsequent opening of the gas intake valve in a suitable manner.

In an additional advantageous embodiment of the invention, the minimum of two measured values, which are used to determine the polytropic exponent are detected in the high-pressure phase. In this way, it is possible for the polytropic exponent, in the frequent cases in which the cylinder pressure sensor is arranged to measure high pressures, to simply be determined very accurately.

According to an additional advantageous embodiment of the invention, a gas constant is determined, as a function of an air-to-fuel ratio in the combustion chamber before the combustion and the exhaust gas mass is determined as a function of the gas constants. This has the advantage that the exhaust gas mass can be determined even more accurately and in addition the air-to-fuel ratio in the combustion chamber is nevertheless determined within the framework of a lambda regulation and as a result of this, it is available without additional costs being incurred.

According to an additional advantageous embodiment of the invention, the temperature of the exhaust gas, which is located in the combustion chamber of the cylinder after closing the gas discharge valve and before subsequent opening of the gas intake valve is determined. This has the advantage that the temperature of the exhaust gas mass, which is located in the combustion chamber after closing the gas discharge valve and before subsequent opening of the gas intake valve, can be determined very easily.

In this context, it is in addition also advantageous if the temperature of the exhaust gas, which is located in the cylinder after closing the gas discharge valve and before subsequent opening of the gas intake valve, is determined as a function of the rotational speed of the internal combustion engine. In this way, it is possible in a simple manner to take into account effects caused by a heat transfer in the area of a piston or a cylinder wall.

According to an additional advantageous embodiment of the invention, a first fuel mass, which should be measured in the combustion chamber of the cylinder after closing the gas discharge valve and before opening the gas intake valve, is determined as a function of the determined exhaust gas mass and the injection valve is actuated accordingly. This is of particular advantage in the case of a self-igniting combustion method in which a high exhaust gas return rate is preferably set in order to obtain high ignition temperatures. By determining a first fuel mass as a function of the determined exhaust gas mass it is possible to set the combustion point of concentration in an accurate manner.

In this context, it is also advantageous if a crankshaft angle to which a first fuel mass is metered, is determined as a function of the determined exhaust gas mass. In this way, it is possible for the combustion point of concentration in the case of a self-igniting combustion method to be set in an accurate manner.

In an additional advantageous embodiment of the invention, the crankshaft angle, at which a second fuel mass is metered, is determined as a function of the determined exhaust gas mass. The second fuel mass is metered in the cylinder after the opening of the gas intake valve. In this way, it is possible to set a combustion point of concentration in the case of a self-igniting combustion method in an accurate manner.

BRIEF DESCRIPTION OF THE DRAWINGS

The invention is explained in detail below as an embodiment on the basis of the accompanying drawings. They are as follows.

Elements with the same design or function are characterized in all the figures with the same reference symbols.

DETAILED DESCRIPTION OF INVENTION

Figure 1:
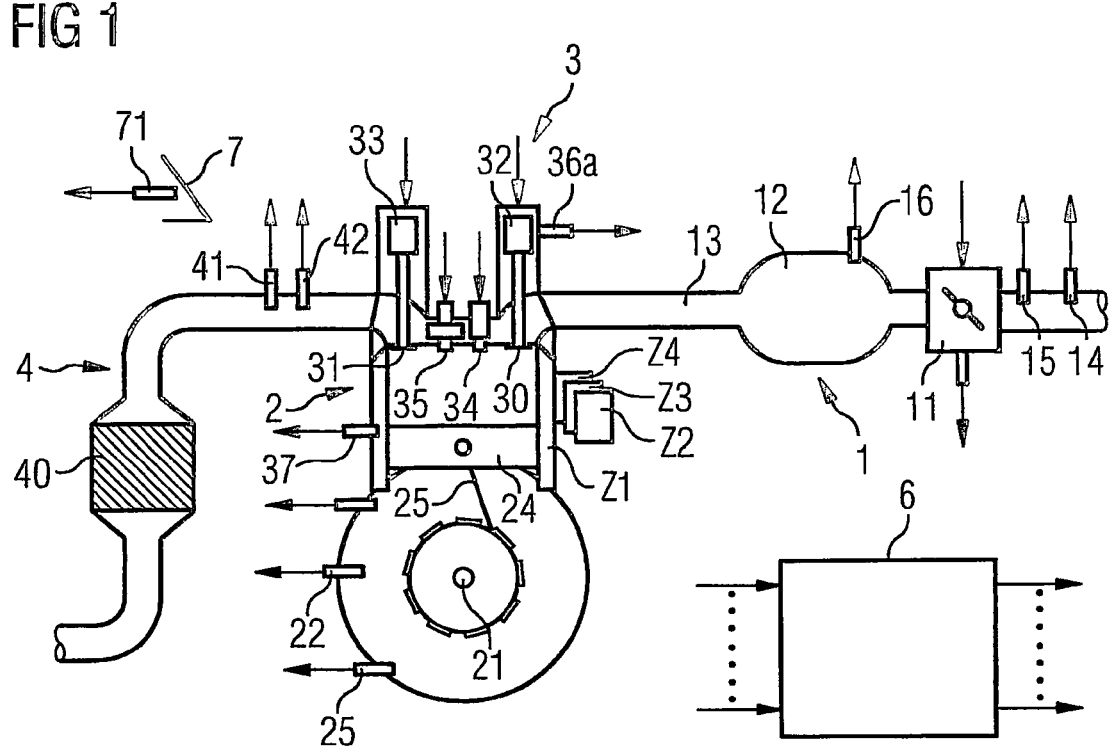
FIG. 1 an internal combustion engine with a control device,
FIG. 2 a flowchart of a first part of a program for controlling an internal combustion engine and
FIG. 3 a flowchart of a second part of the program for controlling an internal combustion engine.

An internal combustion engine (FIG. 1) includes an intake tract 1, an engine block 2, a cylinder head 3 and an exhaust gas tract 4. The intake tract 1 preferably includes a throttle valve 11, a manifold 12 and an intake pipe 13, which is routed to a cylinder Z1 via an intake port in the engine block 2. The engine block 2 also includes a crankshaft 21, which is connected to the piston 24 of a cylinder Z1 by means of a connecting rod 25.

The cylinder head 3 includes a drive with a gas intake valve 30, a gas discharge valve 31 and the valve gears 32, 33. The cylinder head 3 also includes both an injection valve 34 and a spark plug 35. Alternatively, the injection valve 34 can also be arranged in the intake pipe 13.

The exhaust gas tract 4 includes a catalytic converter 40, which is preferably embodied as a three-way catalytic converter.

In addition, a control device 6 is provided to which sensors have been allocated, said sensors detecting the different measured quantities and in each case determining the measured value of the measured quantity. The control device 6 determines, in accordance with at least one of the measured quantities, the controlling variables, which are then converted into one or more adjusting signals for controlling the final control elements by means of corresponding actuators. The control device 6 can also be referred to as a device for controlling an internal combustion engine.

The sensors are a pedal position indicator 71 which detects the position of a gas pedal 7, an air mass flow meter 14 which detects an air mass flow upstream of the throttle valve 11, a temperature sensor 15 which detects the intake air temperature, a crankshaft angle sensor 22 which detects a crankshaft angle CRK to which a rotational speed N is allocated, a further temperature sensor 42 which detects an exhaust gas TABG in the exhaust gas tract 4, a camshaft angle sensor 36a which detects a camshaft angle, a cylinder pressure sensor 37 which detects a pressure p in a combustion chamber of a cylinder Z1, and an exhaust gas probe 41 which detects a residual oxygen content of the exhaust gas and the measuring signal of which is characteristic of the air-to-fuel ratio in a cylinder Z1. Depending on the embodiment of the invention, there can be any subset of the sensors mentioned or there can even be additional sensors.

The final control elements are, for example, the throttle valve 11, the gas intake and the gas discharge valves 30, 31, the injection valve 34 and the spark plug 35.

In addition to the cylinder Z1, the internal combustion engine can also have other cylinders, namely the cylinders Z2-Z4, to which final control elements are allocated accordingly.

Figure 2:
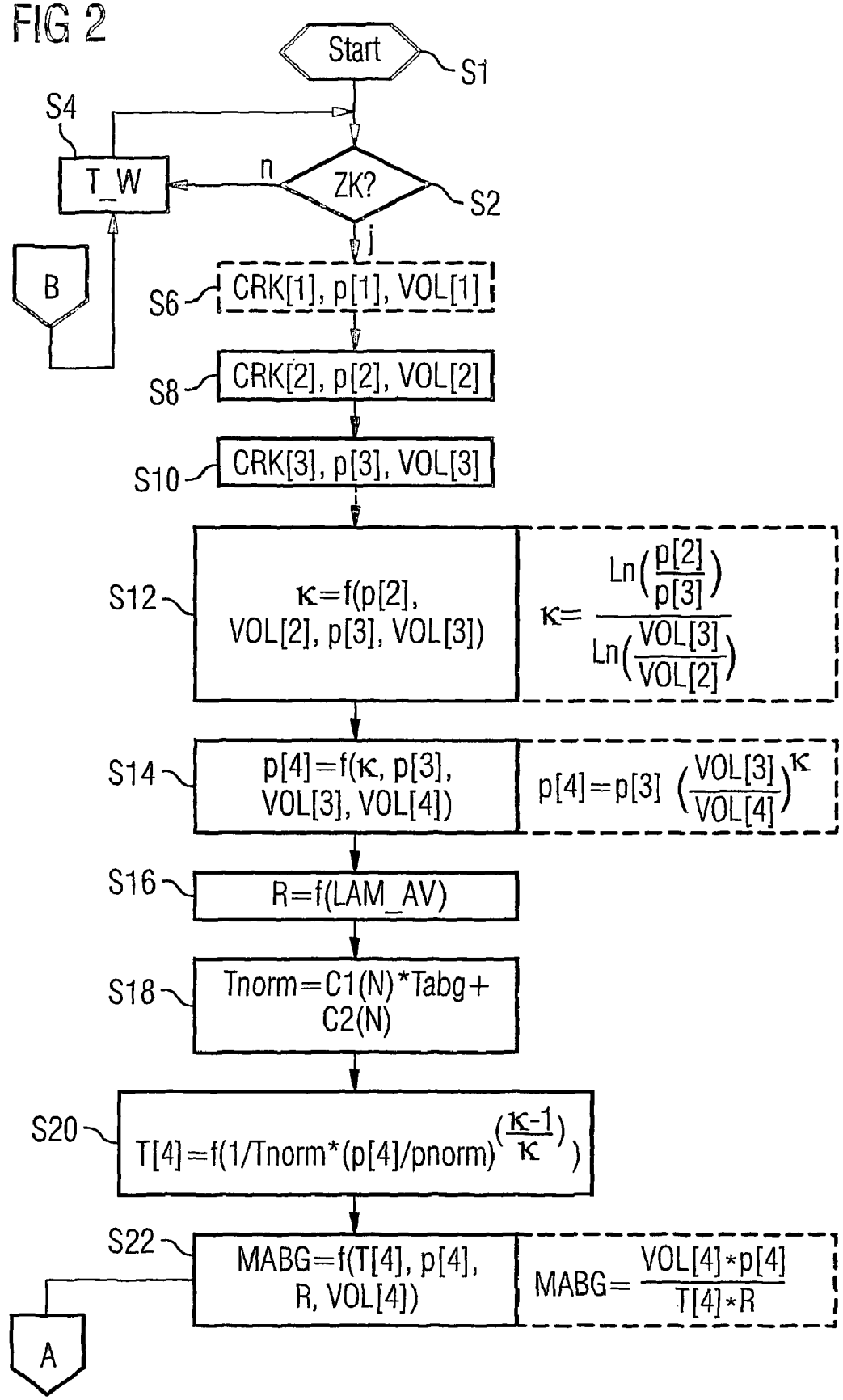
Figure 3:
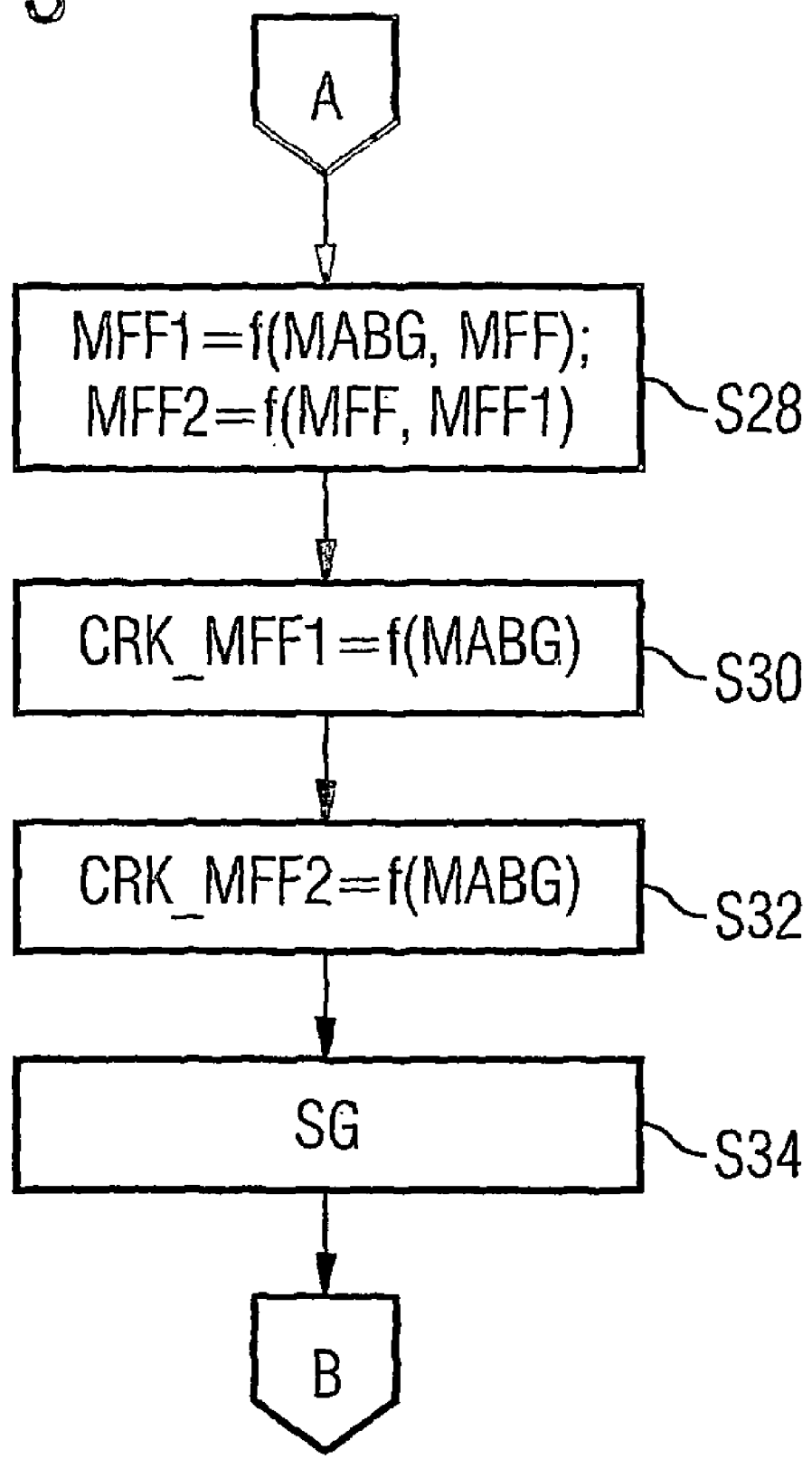

A program for controlling the internal combustion engine is started in a step S1 (FIG. 2), in which variables are initialized, if required.

In a step S2, a test is performed to determine whether or not the specific cylinder is indeed in an intermediate compression ZK. To this end, the intermediate compression ZK, in this context means the said crankshaft angle range in which both the gas discharge valve 31 and the gas intake valve 30 are closed and is done after closing the gas discharge valve 31 and before subsequent opening of the gas intake valve 30.

If the condition of a step S2 has not been satisfied, the program will continue in a step S4, where it then remains for a predetermined waiting period T_W or a predetermined crankshaft angle before the condition of a step S2 is tested anew.

On the other hand, if the condition of a step S2 is satisfied, a first measured value p[1] of the pressure in the combustion chamber of the cylinder Z1 is detected in a step S6 by means of the cylinder pressure sensor 37. In the case of subsequent magnitudes the figures given in brackets, in each case refer to the relevant values for each crankshaft angle CRK. As a result of this, the first measured value p[1] is detected if the crankshaft angle CRK is [1]. VOL[1] is the relevant volume of the internal combustion engine of cylinder Z1.

In a step S8, a second measured value p[2] of the pressure in the combustion chamber of the cylinder Z1 is detected at a crankshaft angle CRK[2] and the relevant volume VOL[2] of the combustion chamber is determined. In a step S10, a third measured value p[3] of the pressure in the combustion chamber of the cylinder Z1 is detected at a crankshaft angle CRK [3] and the relevant volume VOL [3] of the combustion chamber of a cylinder Z1 is assigned. Particularly when the cylinder pressure sensor 37 is arranged to detect higher pressures in the combustion chamber of a cylinder Z1, the crankshaft angles CRK[1], CRK[2] and CRK[3] are advantageously selected in a high-pressure p of the intermediate compression ZK. The highest pressure is obtained during the intermediate compression in the vicinity of the upper dead center of the piston of a cylinder Z1.

Subsequently, in a step S12, a polytropic exponent K is determined as a function of the second measured value p[2] of the pressure in the combustion chamber of a cylinder Z1, of the volume VOL[2] of the combustion chamber of a cylinder Z1 assigned to it, of the third measured value p[3] of the pressure in the combustion chamber of a cylinder Z1 and of the relevant volume VOL[3]. This preferably takes place by means of a corresponding solution of the polytropic equation according to the polytropic exponent K in the same way as it is for example given in the right-hand part of a step S12.

The polytropic exponent K is preferably averaged by repeatedly determining the polytropic exponent K by means of different permutations of the value pairs of steps S6 to S10. This enables measuring errors to be reduced and thereby allows the polytropic exponent K to be determined even more accurately.

In a step S14, an estimated value p[4] of the pressure in the combustion chamber of a cylinder Z1 is then preferably determined for a crankshaft angle CRK in the vicinity of the closing of the gas discharge valve. This preferably takes place as a function of the polytropic exponent K, of the third measured value p[3], of the volume VOL[3] of the combustion chamber of a cylinder Z1 assigned to it and of the volume VOL[4] assigned to the estimated value p[4] of the pressure in the combustion chamber of a cylinder Z1. Alternatively, it is also possible in this case to use another measured value of the pressure and a correspondingly assigned volume. In addition, it is also possible in the case of a suitable embodiment of the cylinder pressure sensor 37, that the estimated value p[4] of the pressure in the combustion chamber of a cylinder is a corresponding measured value.

The estimated value p[4] of the pressure in the combustion chamber of a cylinder Z1 is preferably determined by means of the formula given on the right-hand side in a step S14.

In a step S16, a gas constant R is preferably determined as a function of an actual value LAM_AV of the air-to-fuel ratio in the combustion chamber of a cylinder before the combustion of the air-to-fuel ratio, which is derived from the measuring signal of the oxygen probe 41. In a simpler embodiment of the program, a gas constant R is assigned to a predetermined value in a step S16. Even in this way, a sufficient accuracy can be ensured in individual cases in further calculations if the gas constant R only has a limited variability.

In a step S18, a reference temperature Tnorm is determined as a function of the exhaust gas temperature TABG, which is detected by the additional temperature sensor 42 in the exhaust gas tract 4. In addition, the reference temperature Tnorm is determined as a function of a rise value C1 and a displacement value C2. The rise value and the displacement value C1 and C2 must preferably be determined beforehand for different rotational speeds by means of tests with the internal combustion engine or simulations and stored in a performance graph as a function of the rotational speed N. In this way, the reference temperature Tnorm is preferably determined by means of the formula given in a step S18 and refers to a reference pressure Pnorm in the combustion chamber of a cylinder Z1. Alternatively, the rise value and the displacement value C1, C2 can also be determined as the analytical functions of a rotational speed N and if required a pre-injection. The exhaust gas temperature TABG, which is detected by the additional temperature sensor 42, is preferably detected as close as possible to the closing of the gas discharge valve.

The temperature T[4] of the exhaust gas in the combustion chamber of a cylinder is determined in a step S20, which must be assigned to the estimated value p[4] of the pressure in the combustion chamber of a cylinder. This preferably takes place by means of the corresponding application of the polytropic equation as a function of the reference temperature Tnorm, the pressure p[4] in the combustion chamber of a cylinder Z1, the reference pressure pnorm and the polytropic exponent K.

Subsequently, in a step S22, the exhaust gas mass which is located in the cylinder Z1 after closing the gas discharge valve 33 and before subsequent opening of the gas intake valve 32 is then determined. This is done by applying the ideal gas equation as a function of the temperature T[4], the assigned estimated value p[4] of the pressure in the combustion chamber of a cylinder Z1 of the gas constant R and the assigned volume VOL[4] of the combustion chamber of a cylinder Z1. The crankshaft angle assigned to the pressure p[4] is preferably selected in such a way that at this point in time a metering of a first fuel mass MFF1 to be metered has not yet taken place. Should this be the case, then it is possible to carry out a simple determination of the exhaust gas mass MABG. Should this not be the case, then the first supplied fuel mass MFF1 should still be taken into account in this case.

If necessary, it can be advantageous to correct the exhaust gas mass MABG determined in a step S22 again by means of a correction value, which takes into account mass loses as a result of leakages in the cylinder, referred to as so-called blow-by.

The subsequent steps S28 to S32 are executed if the internal combustion engine is operated by means of the space ignition method. On the other hand, if the internal combustion engine is operated by means of another combustion method, then it is possible that the determined exhaust gas mass MABG can be an input variable for any functions of the control device.

In a step S28, a first fuel mass MFF1 to be supplied is determined as a function of the exhaust gas mass MABG and a fuel mass MFF to be supplied together to a cylinder Z1 during a working cycle of the cylinder Z1, i.e. both fuel masses must be supplied or fed to said cylinder. This is preferably also determined as a function of the exhaust gas mass MABG and/or the exhaust gas temperature TABG. The first fuel mass MFF1 is metered during the intermediate compression ZK of a cylinder Z1 in the combustion chamber of a cylinder Z1.

By metering the first fuel mass MFF1 during the intermediate compression ZK, an exothermal reaction takes place because of the oxygen content in the exhaust gas, which as a rule remains low and a fractioning of the metered fuel, in which case radicals develop, which accelerate the later ignition and combustion of the air-to-fuel mixture in the cylinder.

Because of a first fuel mass MFF1 to be supplied, the point in time of the self ignition of the air-to-fuel mixture can be set effectively in this way. In this, it is of utmost importance that it is possible to differentiate clearly between the exhaust gas mass MABG from working cycle to working cycle and then, on the other hand, that the said exhaust gas mass has a strong influence on the combustion of the next working cycle. This can be compensated for by setting the first fuel mass MFF1 in a corresponding manner and in this way the ignition point in time of the air-to-fuel mixture can be set in an accurate manner.

In addition, in a step S28 a second fuel mass is also determined as a function of the fuel mass MFF, which must be metered together with the first fuel mass MFF1 in a cylinder Z1. This preferably takes place by means of calculating the difference between the fuel mass MFF, which must be metered together with the first fuel mass MFF1 in a cylinder Z1. The second fuel mass MFF2 is only metered in a cylinder Z1 after opening of the gas intake valve 30.

Alternatively, it is also possible that the second fuel mass MFF2 can be determined as a function of the exhaust gas mass MABG and the fuel mass MFF to be supplied.

In a step S30, a crankshaft angle CRK_MFF1 of metering the first fuel mass MFF1 is preferably determined as a function of the determined exhaust gas mass MABG. It is possible that even the crankshaft angle CRK_MFF1 of metering the first fuel mass MFF1 can influence the ignition point in time of the air-to fuel mixture in a cylinder Z1 in an advantageous manner.

In a step S32, a crankshaft angle CRK_MFF2 is determined depending on the exhaust gas mass MABG of the exhaust gas, which also influences the ignition point in time of the air-to-fuel mixture in a cylinder Z1.

The crankshaft angles CRK_MFF1, CRK_MFF2 of metering the first fuel mass or the second fuel mass MFF1, MFF2 are also determined as a function of the exhaust gas temperature TABG in a preferred manner.

In a step S34, corresponding actuation signals SG for actuating the injection valve 34 are determined. Alternatively, it is also for example possible in steps S30 and S32 that the crankshaft angle CRK_MFF1 and/or the crankshaft angle CRK_MFF2 of metering the first fuel mass or the second fuel mass MFF1, MFF2 can be independent from the determined exhaust gas mass MABG. In addition, it is also possible that the first fuel mass MFF1 can alternatively be independent from the determined exhaust gas mass MABG.

In order to actuate the injection valves 34 of the additional cylinders Z2 to Z4, corresponding programs are processed in the control device 6, which can also be referred to as a device for controlling the internal combustion engine.

The logarithmic calculations required to determine the polytropic exponent K are converted in an advantageous manner by means of corresponding performance graphs, which have been determined beforehand.

The invention claimed is:

1. A method for controlling an internal combustion engine, comprising:
  providing:
    an engine block having a cylinder,
    a crank shaft arranged in the block,
    a cylinder head arranged on the block opposite the crank shaft,
    a combustion chamber defined in the cylinder of the block and below the cylinder head,
    an intake tract connected to the combustion chamber as a function of the position of a gas intake valve,
    an exhaust gas tract connected to the combustion chamber as a function of the position of a gas discharge valve, and
    a cylinder pressure sensor that detects a pressure in the combustion chamber;
  measuring the pressure in the combustion chamber after closing the gas discharge valve and before subsequent opening of the gas intake valve;
  detecting a plurality of the measured values of the pressure in the combustion chamber;
  determining a polytropic exponent as a function of the plurality of detected values of the pressure in the combustion chamber;
  determining an exhaust gas mass in the cylinder after closing the gas discharge valve and before subsequent opening of the gas intake valve as a function of:
    the polytropic exponent at an estimated value of the pressure after closing the gas discharge valve and before subsequent opening of the gas intake valve, and
    a temperature of the exhaust gas in the cylinder after closing the gas discharge valve and before subsequent opening of the gas intake valve; and
  generating an actuation signal for controlling an actuating member of the internal combustion engine as a function of the determined exhaust gas mass.

2. The method as claimed in claim 1, wherein a measured value of the pressure used to determine the estimated value of the pressure in the combustion chamber is based on a high-pressure phase and is measured after closing the gas discharge valve and before subsequent opening of the gas intake valve.

3. The method as claimed in claim 1, wherein the minimum of the plurality of the measured values of the pressure in the combustion chamber used to determine the polytropic exponent are detected in the high-pressure phase.

4. The method as claimed in claim 1,
  wherein a gas constant is determined as a function of an air-to-fuel ratio in the combustion chamber before the combustion of the air and fuel mixture, and
  wherein the exhaust gas mass is determined as a function of the gas constant.

5. The method as claimed in claim 1, wherein the temperature of the exhaust gas in the cylinder after closing the gas discharge valve and before subsequent opening of the gas intake valve is determined as a function of a detected temperature of the exhaust gas in the exhaust gas tract.

6. The method as claimed in claim 5, wherein the temperature of the exhaust gas in the cylinder after closing the gas discharge valve and before subsequent opening of the gas intake valve is determined as a function of the rotational speed of the internal combustion engine.

7. The method as claimed in claim 1, wherein a first fuel mass of the combustion chamber after closing the gas discharge valve and before opening the gas intake valve is determined as a function of the determined exhaust gas mass.

8. The method as claimed in claim 7, wherein an injection valve is actuated according to the determined first fuel mass.

9. The method as claimed in claim 8, wherein a first crankshaft angle of the crank shaft is determined as a function of the determined exhaust gas mass.

10. The method as claimed in claim 9, wherein the first fuel mass is metered as a function of the first crankshaft angle.

11. The method as claimed in one of the claim 10, wherein a second crankshaft angle is determined as a function of the determined exhaust gas mass in which case a second fuel mass is metered in the cylinder after the opening of the gas intake valve based on the second crankshaft angle.

12. A device for controlling an internal combustion engine having a cylinder with a combustion chamber, an intake tract in communication with the combustion chamber of the cylinder as a function of the position of a gas intake valve, an exhaust gas tract in communication with the combustion chamber of the cylinder as a function of the position of a gas discharge valve, and a cylinder pressure sensor that detects a pressure in the combustion chamber of the cylinder, comprising:
- a polytropic exponent determining component that determines a polytropic exponent as a function of a plurality of measured values of the pressure in the combustion chamber of the cylinder, where the plurality of measured values are detected after closing the gas discharge valve and before subsequent opening of the gas intake valve;
- an exhaust gas mass determining component that determines an exhaust gas mass located in the cylinder after closing the gas discharge valve and before subsequent opening of the gas intake valve and determines the exhaust gas mass as a function of:
  - the polytropic exponent at an estimated value of the pressure after closing the gas discharge valve and before subsequent opening of the gas intake valve and
  - a temperature of the exhaust gas which is located in the cylinder after closing the gas discharge valve and before subsequent opening of the gas intake valve; and
- a signal actuation generator that generates an actuation signal for controlling an actuating member of the internal combustion engine as a function of the determined exhaust gas mass.

13. The device as claimed in claim 12, wherein a measured value of the pressure used to determine the estimated value of the pressure in the combustion chamber is based on a high-pressure phase and is measured after closing the gas discharge valve and before subsequent opening of the gas intake valve.

14. The device as claimed in claim 12, wherein a minimum of the plurality of the measured values of the pressure in the combustion chamber used to determine the polytropic exponent are detected in the high-pressure phase.

15. The device as claimed in claim 12,
wherein a gas constant is determined as a function of an air-to-fuel ratio in the combustion chamber before the combustion of the air and fuel mixture, and
wherein the exhaust gas mass is determined as a function of the gas constant.

16. The device as claimed in claim 12, wherein the temperature of the exhaust gas in the cylinder after closing the gas discharge valve and before subsequent opening of the gas intake valve is determined as a function of a detected temperature of the exhaust gas in the exhaust gas tract.

17. The device as claimed in claim 16, wherein the temperature of the exhaust gas in the cylinder after closing the gas discharge valve and before subsequent opening of the gas intake valve is determined as a function of the rotational speed of the internal combustion engine.

18. The device as claimed in claim 12,
wherein a first fuel mass of the combustion chamber after closing the gas discharge valve and before opening the gas intake valve is determined as a function of the determined exhaust gas mass, and
wherein an injection valve is actuated according to the determined first fuel mass.

19. The device as claimed in claim 18, wherein a first crankshaft angle of the crank shaft is determined as a function of the determined exhaust gas mass.

20. The device as claimed in claim 19, wherein the first fuel mass is metered as a function of the first crankshaft angle.

* * * * *